US012641639B2

(12) United States Patent
Zhang

(10) Patent No.: US 12,641,639 B2
(45) Date of Patent: May 26, 2026

(54) METHOD FOR PHYSICAL SIDELINK FEEDBACK CHANNEL TRANSMISSION ON SIDELINK, TERMINAL DEVICE, AND STORAGE MEDIUM

(71) Applicant: SPREADTRUM COMMUNICATIONS (SHANGHAI) CO., LTD., Shanghai (CN)

(72) Inventor: Meng Zhang, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 322 days.

(21) Appl. No.: 18/261,379

(22) PCT Filed: Feb. 17, 2022

(86) PCT No.: PCT/CN2022/076669
§ 371 (c)(1),
(2) Date: Jul. 13, 2023

(87) PCT Pub. No.: WO2022/152329
PCT Pub. Date: Jul. 21, 2022

(65) Prior Publication Data
US 2024/0064803 A1 Feb. 22, 2024

(30) Foreign Application Priority Data
Jan. 15, 2021 (CN) .......................... 202110056296.9

(51) Int. Cl.
*H04W 74/0808* (2024.01)
*H04W 92/18* (2009.01)
(52) U.S. Cl.
CPC ........ *H04W 74/0808* (2013.01); *H04W 92/18* (2013.01)

(58) Field of Classification Search
CPC .......................... H04W 74/0808; H04W 92/18
See application file for complete search history.

(56) References Cited

U.S. PATENT DOCUMENTS

2019/0014596 A1* 1/2019 Yang ..................... H04W 72/21
2019/0335433 A1 10/2019 Oh et al.
(Continued)

FOREIGN PATENT DOCUMENTS

CN 107949067 A 4/2018
CN 108781471 A 11/2018
(Continued)

OTHER PUBLICATIONS

Qualcomm Incorporated, 3GPP TSG RAN WG1 Meeting #98, R1-1909245, "Channel access procedures for NR unlicensed", Aug. 26-Aug. 30, 2019. Retrieved from: https://www.3gpp.org/ftp/TSG_RAN/WG1_RL1/TSGR1_98/Docs/R1-1909245.zip.
(Continued)

*Primary Examiner* — Joseph A Bednash
(74) *Attorney, Agent, or Firm* — HAUPTMAN HAM, LLP

(57) ABSTRACT

A method for physical sidelink feedback channel (PSFCH) transmission on a sidelink are provided. Transmission on the sidelink is performed over an unlicensed spectrum. The method includes: determining a listen before talk (LBT) type for transmitting multiple PSFCHs when the multiple PSFCHs are required to be transmitted over the unlicensed spectrum; and performing LBT according to the LBT type determined, and transmitting the multiple PSFCHs according to a sensing result.

3 Claims, 1 Drawing Sheet

(56)           References Cited

U.S. PATENT DOCUMENTS

| | | |
|---|---|---|
| 2020/0037343 A1 | 1/2020 | He et al. |
| 2020/0374978 A1 | 11/2020 | Panteleev et al. |
| 2023/0328374 A1* | 10/2023 | Shabtay ............... H04N 25/133 |
| | | 348/350 |
| 2023/0328784 A1* | 10/2023 | Lei .................... H04W 74/0816 |
| | | 370/329 |

FOREIGN PATENT DOCUMENTS

| | | |
|---|---|---|
| CN | 110996395 A | 4/2020 |
| CN | 111342941 A | 6/2020 |

OTHER PUBLICATIONS

Huawei, HiSilicon, 3GPP TSG RAN WG1 Meeting #98bis, R1-1910045, "Coexistence and channel access for NR unlicensed band operations", Oct. 14-20, 2019. Retrieved from: https://www.3gpp.org/ftp/TSG_RAN/WG1_RL1/TSGR1_98b/Docs/R1-1910045.zip.

WIPO, International Search Report and Written Opinion for International Application No. PCT/CN2022/076669, May 7, 2022.

LG Electronics Inc. "Corrections to 5G V2X with NR Sidelink" 3GPP TSG-RAN WG2 Meeting #111-e R2-2008111, dated Aug. 17-28, 2020.

Notification of grant of patent right for invention issued in corresponding CN application No. 202110056296.9 dated Apr. 3, 2024.

* cited by examiner

Start

Determine an LBT type for transmitting multiple PSFCHs when the multiple PSFCHs are required to be transmitted over an unlicensed spectrum

S101

Perform LBT according to the LBT type determined, and transmit the multiple PSFCHs according to a sensing result

S102

End

2

Determination module

21

Transmission module

22

METHOD FOR PHYSICAL SIDELINK FEEDBACK CHANNEL TRANSMISSION ON SIDELINK, TERMINAL DEVICE, AND STORAGE MEDIUM

CROSS-REFERENCE TO RELATED APPLICATION(S)

This application is a National Stage of International Application No. PCT/CN2022/076669, filed on Feb. 17, 2022, which claims priority to Chinese Patent Application No. 202110056296.9, filed on Jan. 15, 2021, both of which are incorporated herein by reference in their entireties.

TECHNICAL FIELD

The present disclosure relates to the technical field of communication, and in particular to a method for physical sidelink feedback channel (PSFCH) transmission on a side-link, a terminal device, and a storage medium.

BACKGROUND

The conventional sidelink transmission remains to be operated over a licensed spectrum regardless of the fourth-generation mobile communications (4G) or the fifth-generation mobile communications (5G). A future protocol will extend the sidelink transmission to a non-licensed spectrum (namely, unlicensed spectrum), and a remarkable feature of the unlicensed spectrum is that a data transmission policy of listen before talk (LBT) may be adopted.

In sidelink transmission performed over the unlicensed spectrum, especially in physical sidelink feedback channel (PSFCH) transmission, a sidelink can support simultaneous transmission of multiple PSFCHs, and LBT types for the multiple PSFCHs may be different from each other. In this case, how to determine a unique LBT policy is a problem to be solved.

SUMMARY

Embodiment of the present disclosure provide a method for PSFCH transmission on a sidelink. Transmission on the sidelink is performed over an unlicensed spectrum. The method includes: determining an LBT type for transmitting multiple PSFCHs when the multiple PSFCHs are required to be transmitted over the unlicensed spectrum; and performing LBT according to the LBT type determined, and transmitting the multiple PSFCHs according to a sensing result.

Embodiments of the present disclosure further provide a terminal device. The terminal device includes a transceiver, a processor, and a memory storing a computer program. The processor is configured to execute the computer program to cause the terminal device to perform the following. Determine an LBT type for transmitting multiple PSFCHs on a sidelink when the multiple PSFCHs are required to be transmitted over the unlicensed spectrum, where transmission on the sidelink is performed over the unlicensed spectrum. Perform LBT according to the LBT type determined, and transmit the multiple PSFCHs according to a sensing result.

Embodiments of the present disclosure further provide a non-transitory computer-readable storage medium. The computer-readable storage medium stores a computer program. The computer program is executed by a terminal device to perform the following. Determine an LBT type for transmitting multiple PSFCHs on a sidelink when the multiple PSFCHs are required to be transmitted over the unlicensed spectrum, where transmission on the sidelink is performed over the unlicensed spectrum. Perform LBT according to the LBT type determined, and transmit the multiple PSFCHs according to a sensing result.

DETAILED DESCRIPTION

Figures 1, 2:
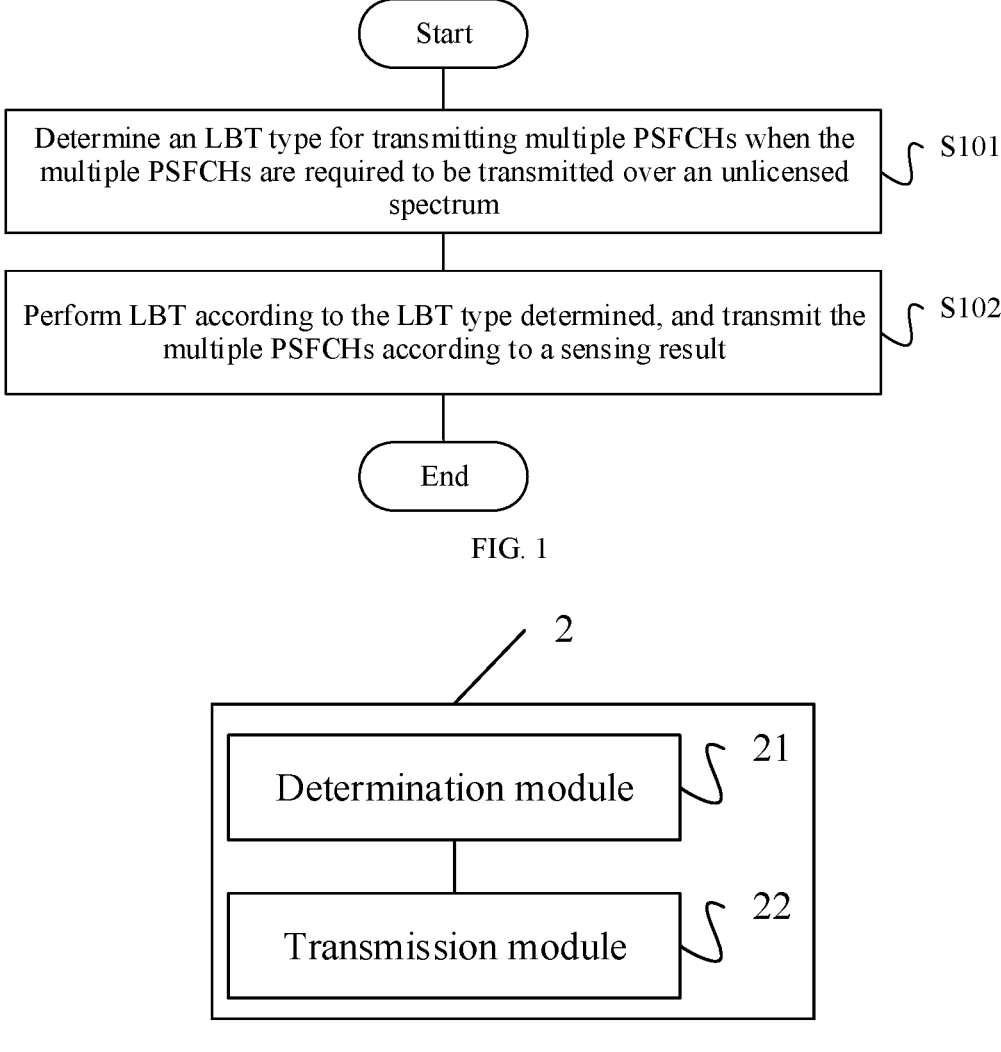
FIG. 1 is a flow chart of a method for physical sidelink feedback channel (PSFCH) transmission on a sidelink according to an embodiment of the present disclosure.
FIG. 2 is a schematic structural diagram of an apparatus for PSFCH transmission on a sidelink according to an embodiment of the present disclosure.

As described in the background, in the related art, in the case where multiple physical sidelink feedback channels (PSFCHs) need to be transmitted simultaneously on a sidelink and the PSFCHs can support different LBT types, user equipment (UE) does not have a suitable solution to determine a unique LBT type to transmit the PSFCHs. Further, this defect will affect the success rate of transmission of the PSFCHs, thereby affecting the communication efficiency of both sides of the sidelink.

In order to solve the foregoing technical problem, embodiments of the present disclosure provide a method for PSFCH transmission on a sidelink. Transmission on the sidelink is performed over an unlicensed spectrum. The method includes: determining an LBT type for transmitting multiple PSFCHs when the multiple PSFCHs are required to be transmitted over the unlicensed spectrum; and performing LBT according to the LBT type determined, and transmitting the multiple PSFCHs according to a sensing result.

With this embodiment, a suitable LBT type for PSFCHs can be determined in sidelink transmission, thus improving the success rate of transmission of the PSFCHs. Further, a relatively high success rate of transmission of the PSFCHs is more beneficial for both sides of the sidelink to accurately obtain a feedback of data reception of the opposite end, thus effectively improving the efficiency of the sidelink communication.

To make the foregoing objects, features, and beneficial effects of the present disclosure more apparent and easier to understand, specific embodiments of the present disclosure are described in detail below with reference to the accompanying drawings.

FIG. 1 is a flow chart of a method for PSFCH transmission on a sidelink according to an embodiment of the present disclosure.

Specifically, the sidelink may be connected to a transmitter (Tx) and a receiver (Rx). Alternatively, the sidelink may also be connected to a base station (gNB) which can transmit information to the Rx through the Tx.

This embodiment may be executed by the Rx, which may be UE. Specifically, this embodiment may be executed by a chip having an LBT function in the UE or by a baseband chip in the UE.

Further, transmission on the sidelink is performed over the unlicensed spectrum. Accordingly, in order to transmit data over the unlicensed spectrum, the Rx needs to execute an LBT procedure. This embodiment focuses on an LBT type used for PSFCH transmission over the unlicensed spectrum. Further, with this embodiment, in the case where the Rx may need to transmit multiple PSFCHs over the unlicensed spectrum simultaneously, the Rx can select a suitable LBT type to transmit the PSFCHs.

Referring to FIG. 1, a method for PSFCH transmission on a sidelink according to this embodiment may include the following.

In S101, determine an LBT type for transmitting the multiple PSFCHs when the multiple PSFCHs are required to transmitted over the unlicensed spectrum.

In S102, perform LBT according to the LBT type determined, and transmit the multiple PSFCHs according to a sensing result.

Specifically, the PSFCH may be used for transmitting a hybrid automatic repeat request (HARQ) feedback for the sidelink.

Further, the LBT type may be a channel access type of type 2A (CAT2 Type 2A), a channel access type of type 2B (CAT2 Type 2B), a channel access type of type 2C (CAT2 Type 2C), or a channel access type of type 1 (CAT4 Type 1). CAT2 Type 2A/CAT2 Type 2B/CAT2 Type 2C/CAT4 Type 1 each may contain a channel access priority class (CAPC) (CAPC 1, CAPC 2, CAPC 3, or CAPC 4). For the specific content of various LBT types, reference can be made to the relevant description in the existing protocol 37.213, which is not repeated here.

In a specific implementation, the multiple PSFCHs may be associated with a unique LBT type, and an association relationship between the PSFCHs and the LBT type may be predetermined by a protocol.

That is to say, it can be predefined by the protocol that all the PSFCHs are associated with a unique LBT type. Accordingly, in S101 and S102, LBT may be executed directly according to the LBT type specified by the protocol, and the multiple PSFCHs may be transmitted according to the sensing result.

Therefore, the signaling overhead of sidelink transmission can be saved.

In a specific implementation, different PSFCHs may be associated with different LBT types. Moreover, the association relationship between a PSFCH and an LBT type may be obtained in sidelink transmission.

Specifically, the association relationship between a PSFCH and an LBT type may be determined in any of the following manners: sidelink control information (SCI) indication; radio resource control (RRC) configuration; RRC (PC5 RRC) configuration for interface transmission of device to device (D2D) direct communication between user planes of UEs using vehicle to everything (V2X) services; downlink control information (DCI) indication; medium access control-control element (MAC-CE) configuration; PC5 MAC-CE configuration; the PSFCH and a physical sidelink shared channel (PSSCH) and/or a physical sidelink control channel (PSCCH) associated with the PSFCH both adopting the same LTB type; and a predefined manner.

Further, different LBT types may have different priorities. For example, a priority of CAT2 Type 2C>a priority of CAT2 Type 2B>a priority of CAT2 Type 2A>a priority of CAT4 Type 1. Further, when the same LBT type is adopted, the priority of the LBT type may be determined according to a priority of a corresponding CAPC. For example, it may be specified that a priority of CAPC 1>a priority of CAPC 2>a priority of CAPC 3>a priority of CAPC 4, or the priority of CAPC 1<the priority of CAPC 2<the priority of CAPC 3<the priority of CAPC 4. "a>b" means that the priority of a is higher than that of b, and "a<b" means that the priority of a is lower than that of b.

Furthermore, if the same LBT type is adopted and priorities of corresponding CAPCs are the same, the priority of the LBT type may be determined according to cyclic prefix extension (CPE). For example, it may be specified that CPE with a shorter time span has a higher priority, or CPE with a longer time span has a higher priority.

The priority of each LBT type may be predetermined by a protocol.

Alternatively, the priority of each LBT type may be indicated by indication information. The indication information may be selected from: DCI, SCI, RRC signaling, PC5 RRC signaling, MAC-CE, and PC5 MAC-CE.

Further, S101 may include: determining, from LBT types associated with the multiple PSFCHs, an LBT type with the highest priority as the LBT type for transmitting the multiple PSFCHs.

In a specific implementation, in S102, LBT may be performed according to the LBT type determined in S101, and when the sidelink is sensed to be idle, the multiple PSFCHs can be transmitted to an opposite end of the sidelink over the unlicensed spectrum.

Therefore, with this embodiment, a suitable LBT type for the PSFCHs can be determined in sidelink transmission, thus improving the success rate of transmission of the PSFCHs. Further, a relatively high success rate of transmission of the PSFCHs is more beneficial for both sides of the sidelink to accurately obtain a feedback of data reception of the opposite end, thus effectively improving the efficiency of the sidelink communication.

FIG. 2 is a schematic structural diagram of an apparatus for PSFCH transmission on a sidelink according to an embodiment of the present disclosure. A person skilled in the art will understand that an apparatus 2 for PSFCH transmission on a sidelink according to this embodiment may be configured to implement the technical solution of the method in the embodiment described in FIG. 1.

Specifically, transmission on the sidelink is performed over an unlicensed spectrum.

Further, referring to FIG. 2, the apparatus 2 for PSFCH transmission on a sidelink according to this embodiment includes a determination module 21 and a transmission module 22. The determination module 21 is configured to determine an LBT type for transmission of multiple PSFCHs when the multiple PSFCHs are required to be transmitted over the unlicensed spectrum. The transmission module 22 is configured to perform LBT according to the LBT type determined, and transmit the multiple PSFCHs according to a sensing result.

For more contents of the operating principle and the operating mode of the apparatus 2 for PSFCH transmission on a sidelink, reference can be made to the relevant description in FIG. 1, which is not repeated here.

In a specific implementation, the apparatus 2 for PSFCH transmission on a sidelink may correspond to a processing chip having an LBT function in UE, or correspond to a chip having a data processing function, such as a baseband chip, or correspond to a chip module including a processing chip in the UE, or correspond to a chip module having a data processing function chip, or correspond to the UE.

In a specific implementation, various modules/units included in various apparatuses and products described in the foregoing embodiments may be software modules/units, may be hardware modules/units, or may be partially software modules/units and partially hardware modules/units.

For example, various modules/units included in various apparatuses and products applied or integrated to a chip may be implemented in the form of hardware such as a circuit, or the modules/units may be at least partially implemented in the form of a software program executed on a processor integrated inside the chip. The remaining (if any) modules/ units may be implemented in the form of hardware such as a circuit. Various modules/units included in various apparatuses and products applied or integrated to a chip module may be implemented in the form of hardware such as a circuit, different modules/units may be located in the same component (for example, a chip, a circuit module, etc.) or different components of the chip module, or the modules/ units may be at least partially implemented in the form of a software program executed on a processor integrated inside the chip module. The remaining (if any) modules/units may be implemented in the form of hardware such as a circuit. Various modules/units included in various apparatuses and products applied or integrated to a terminal may be implemented in the form of hardware such as a circuit, different modules/units may be located in the same component (for example, a chip, a circuit module, etc.) or different components of the terminal, or the modules/units may be at least partially implemented in the form of a software program executed on a processor integrated inside the terminal. The remaining (if any) modules/units may be implemented in the form of hardware such as a circuit.

The embodiments of the present disclosure further provide a computer-readable storage medium. The computer-readable storage medium is a non-volatile storage medium or a non-transitory storage medium having a computer program stored thereon. The computer program, when executed by a processor, performs the operations of the method for PSFCH transmission on a sidelink provided in any of the foregoing embodiments.

The embodiments of the present disclosure further provide another apparatus for PSFCH transmission on a sidelink, including a memory and a processor. The memory stores a computer program executable on the processor. The processor, when executing the computer program, performs the operations of the method for PSFCH transmission on a sidelink provided in the embodiment illustrated in FIG. 1.

A person of ordinary skill in the art may understand that all or some of the operations of the various methods in the foregoing embodiments may be implemented by hardware, or may be completed by indicating the associated hardware through a program. The program may be stored in a computer-readable storage medium. The storage medium may include: a read-only memory (ROM), a random access memory (RAM), a magnetic disk or optical disc, etc.

The technical solution of the present disclosure may be applied to a fifth generation (5G) communication system, a fourth generation (4G) communication system, and a third generation (3G) communication system, and may be applied to various communication systems subsequently evolved, such as a sixth generation (6G) communication system and a seventh generation (7G) communication system.

The technical solution of the present disclosure may also be applicable to different network architectures, including but not limited to relay network architectures, dual connectivity architectures, and vehicle-to-everything architectures.

The 5G-core network (CN) described in the embodiments of the present disclosure may also be referred to as a new core, or 5G new core, or a next generation core (NGC), etc. The 5G-CN is independent of conventional core networks, such as an evolved packet core (EPC).

A base station (BS) in the embodiments of the present disclosure, also referred to as a base station device, is an apparatus deployed in a radio access network to provide a radio communication function. For example, devices providing base station functions in second generation (2G) networks may include a base transceiver station (BTS) and a base station controller (BSC). Devices providing base station functions in 3G networks include a NodeB and a radio network controller (RNC). Devices providing base station functions in 4G networks include an evolved NodeB (eNB). Devices providing base station functions in wireless local area networks (WLAN) include an access point (AP). Devices providing base station functions in 5G new radio (NR) include a generation NodeB (gNB), and devices providing base station functions in future new communication systems, etc.

The terminal in the embodiments of the present disclosure may refer to various forms of UEs, access terminals, subscriber units, subscriber stations, mobile radio stations, mobile stations (MS), remote stations, remote terminals, mobile devices, user terminals, terminal equipment, wireless communication devices, user agents or user apparatuses. The terminal device may also be a cellular telephone, a cordless telephone, a session initiation protocol (SIP) telephone, a wireless local loop (WLL) station, or a personal digital assistant (PDA), or may be a device having a wireless communication function such as a handheld device, a computing device or other processing devices connected to a wireless modem, a vehicle-mounted device, or a wearable device, or may be a terminal device in a future 5G network or terminal device in a future evolved public land mobile network (PLMN), etc. The embodiments of the present disclosure are not limited thereto.

In the embodiments of the disclosure, a one-way communication link from an access network to a terminal is defined as a downlink, data transmitted on the downlink is downlink data, and a transmission direction of the downlink data is referred to as a downlink direction. A one-way communication link from the terminal to the access network is defined as an uplink, data transmitted on the uplink is uplink data, and a transmission direction of the uplink data is referred to as an uplink direction.

It is to be understood that the term "and/or" herein describes only an association relationship for describing associated objects and represents that three relationships may exist. For example, A and/or B may represent the following three cases: only A exists, both A and B exist, and only B exists. In addition, the character "I" herein indicates an "or" relationship between the associated objects.

In the embodiments of the present disclosure, "a plurality of" or "multiple" means two or more than two.

First, second, and other terms in the embodiments of the present disclosure are only for illustrating and distinguishing the objects described, not in order, and are not intended to be particularly limited to the number of devices in the embodiments of the present disclosure, without any limitation on the embodiments of the present disclosure.

"Connection" or "coupling" in the embodiments of the present disclosure refers to various connection or coupling modes such as direct connection or coupling, or indirect connection or coupling, to realize communication between devices. The embodiments of the present disclosure are not limited thereto.

"Network" and "system" in the embodiments of the present disclosure express the same concept. A communication system is a communication network.

It is to be understood that in the embodiments of the present disclosure, the processor may be a central processing unit (CPU). The processor may also be another general-purpose processor, a digital signal processor (DSP), an application specific integrated circuit (ASIC), a field programmable gate array (FPGA) or another programmable logic device, a discrete gate or transistor logic device, or a discrete hardware component. The general-purpose processor may be a microprocessor, or the processor may be any conventional processor.

It is also to be understood that the memory in the embodiments of the present disclosure may be a volatile memory or a non-volatile memory, or may include both the volatile memory and the non-volatile memory. The non-volatile memory may be a ROM, a programmable ROM (PROM), an erasable PROM (EPROM), an electrically EPROM (EEPROM), or a flash memory. The volatile memory may be a RAM that serves as an external cache. By way of illustration, but not limitation, many forms of RAM are available, including a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct rambus RAM (DR RAM).

The foregoing embodiments may be implemented in whole or in part by using software, hardware, firmware, or any combination thereof. When implemented by using software, the foregoing embodiments may be implemented in whole or in part in the form of a computer program product. The computer program product includes one or more computer instructions or computer programs. When the computer instructions or the computer programs are loaded or executed on a computer, the procedures or functions according to the embodiments of the present disclosure are generated in whole or in part. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a digital versatile disc (DVD), or a semiconductor medium. The semiconductor medium may be a solid state disk.

It is to be understood that sequence numbers of the processes do not mean an execution sequence in the embodiments of the present disclosure. The execution sequence of the processes should be determined based on functions and internal logic of the processes, and should not be construed as any limitation on implementation processes of the embodiments of the present disclosure.

In the several embodiments provided in the present disclosure, it is to be understood that the disclosed method, apparatus, and system may be implemented in other manners. For example, the described apparatus embodiment is merely an example. For example, the unit division is merely a logical function division and may be other division during actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separated. The components displayed as units may or may not be physical units, and may be located in one place or may be distributed over multiple network units. Some or all of the units may be selected according to actual needs to achieve the objects of this embodiment.

In addition, functional units in the embodiments of the present disclosure may be integrated into one processing unit, or each of the units may be physically included, or two or more units may be integrated into one unit. The integrated unit may be implemented in the form of hardware, or may be implemented in a form of hardware plus a software functional unit.

The integrated unit implemented in the form of a software functional unit may be stored in a computer-readable storage medium. The software functional unit is stored in a storage medium and includes multiple instructions for causing a computer device (which may be a personal computer, a server, a network device) to perform some operations of the method in the embodiments of the present disclosure. The foregoing storage medium includes various media capable of storing program codes, such as, a universal serial bus (USB) flash drive, a mobile hard disk, a ROM, a RAM, a magnetic disk, or an optical disc.

Although the present disclosure is disclosed above, the present disclosure is not limited thereto. A person skilled in the art can make various changes and modifications without departing from the spirit and the scope of the present disclosure. Therefore, the protection scope of the present disclosure should be subject to the scope defined by the claims.

What is claimed is:

1. A method for physical sidelink feedback channel (PSFCH) transmission on a sidelink, transmission on the sidelink being performed over an unlicensed spectrum, and the method comprising:

determining a listen before talk (LBT) type for transmitting a plurality of PSFCHs when the plurality of PSFCHs are required to be transmitted over the unlicensed spectrum; and performing LBT according to the LBT type determined, and transmitting the plurality of PSFCHs according to a sensing result, wherein different PSFCHs are associated with different LBT types, and the determining the LBT type for transmitting the plurality of PSFCHs comprises:

determining, from LBT types associated with the plurality of PSFCHs, an LBT type with a highest priority as the LBT type for transmitting the plurality of PSFCHs, and wherein a priority of each LBT type is determined according to the LBT type, a corresponding channel access priority class (CAPC), and cyclic prefix extension (CPE).

2. A terminal device comprising:

a transceiver;

a processor; and a memory storing a computer program;

the processor being configured to execute the computer program to cause the terminal device to:

determine a listen before talk (LBT) type for transmitting a plurality of physical sidelink feedback channels (PSFCHs) on a sidelink when the plurality of PSFCHs are required to be transmitted over an unlicensed spectrum, transmission on the sidelink being performed over the unlicensed spectrum; and perform LBT according to the LBT type determined, and transmit the plurality of PSFCHs according to a sensing result, wherein different PSFCHs are associated with different LBT types, and the processor configured to execute the computer program to cause the terminal device to determine the LBT type for transmitting the plurality of PSFCHs is configured to execute the computer program to cause the terminal device to:

determine, from LBT types associated with the plurality of PSFCHs, an LBT type with a highest priority as the LBT type for transmitting the plurality of PSFCHs, and wherein a priority of each LBT type is determined according to the LBT type, a corresponding channel access priority class (CAPC), and cyclic prefix extension (CPE).

3. A non-transitory computer-readable storage medium storing a computer program, the computer program being executed by a terminal device to:

determine a listen before talk (LBT) type for transmitting a plurality of physical sidelink feedback channels (PSFCHs) on a sidelink when the plurality of PSFCHs are required to be transmitted over an unlicensed spectrum, transmission on the sidelink being performed over the unlicensed spectrum; and perform LBT according to the LBT type determined, and transmit the plurality of PSFCHs according to a sensing result, wherein different PSFCHs are associated with different LBT types, and the computer program executed by the terminal device to determine the LBT type for transmitting the plurality of PSFCHs is executed by the terminal device to:

determine, from LBT types associated with the plurality of PSFCHs, an LBT type with a highest priority as the LBT type for transmitting the plurality of PSFCHs, and wherein a priority of each LBT type is determined according to the LBT type, a corresponding channel access priority class (CAPC), and cyclic prefix extension (CPE).

* * * * *